US011216539B2

(12) United States Patent
Chang et al.

(10) Patent No.: US 11,216,539 B2
(45) Date of Patent: *Jan. 4, 2022

(54) AUTHORIZATION PROXY PLATFORM

(71) Applicant: Oracle International Corporation, Redwood Shores, CA (US)

(72) Inventors: Tuck Chang, Santa Clara, CA (US); Srikant Krishnapuram Tirumalai, San Jose, CA (US); Zhengming Zhang, Ontario (CA)

(73) Assignee: Oracle International Corporation, Redwood Shores, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 16/381,950

(22) Filed: Apr. 11, 2019

(65) Prior Publication Data

US 2020/0125700 A1 Apr. 23, 2020

Related U.S. Application Data

(60) Provisional application No. 62/748,105, filed on Oct. 19, 2018.

(51) Int. Cl.
 *G06F 21/31* (2013.01)
 *H04L 29/06* (2006.01)
 *H04L 29/08* (2006.01)
 *G06F 21/62* (2013.01)

(52) U.S. Cl.
 CPC .......... *G06F 21/31* (2013.01); *G06F 21/6218* (2013.01); *H04L 63/0807* (2013.01); *H04L 67/2804* (2013.01); *H04L 67/2809* (2013.01)

(58) Field of Classification Search
 CPC . G06F 21/31; G06F 21/6218; H04L 63/0807; H04L 67/2804; H04L 67/2809
 See application file for complete search history.

(56) References Cited

U.S. PATENT DOCUMENTS

| 2017/0048163 | A1* | 2/2017 | Pan ..................... H04L 67/1031 |
| 2018/0027049 | A1* | 1/2018 | Atlas .................. H04L 63/0807 |
| | | | 709/223 |
| 2019/0182250 | A1* | 6/2019 | Kiester ............... H04L 63/0428 |
| 2019/0349426 | A1* | 11/2019 | Smith .................. H04L 67/104 |

* cited by examiner

*Primary Examiner* — Ashokkumar B Patel
*Assistant Examiner* — William B Jones
(74) *Attorney, Agent, or Firm* — Invoke

(57) ABSTRACT

Techniques for brokering authorization between a user-facing service and a backend service are disclosed. A proxy service, operating independently of the user-facing service and the backend service, exposes an application programming interface (API) configured to receive requests from the user-facing services to perform functions of the plurality of backend services. The proxy service stores user authorization data that authorizes a user of a particular user-facing service to use a function of a backend service. The proxy service receives, via the API, a request to perform the function for an account associated with the user. Responsive to receiving to the request, the proxy service uses the user authorization data to access the backend service to perform the function for the account associated with the user.

23 Claims, 11 Drawing Sheets

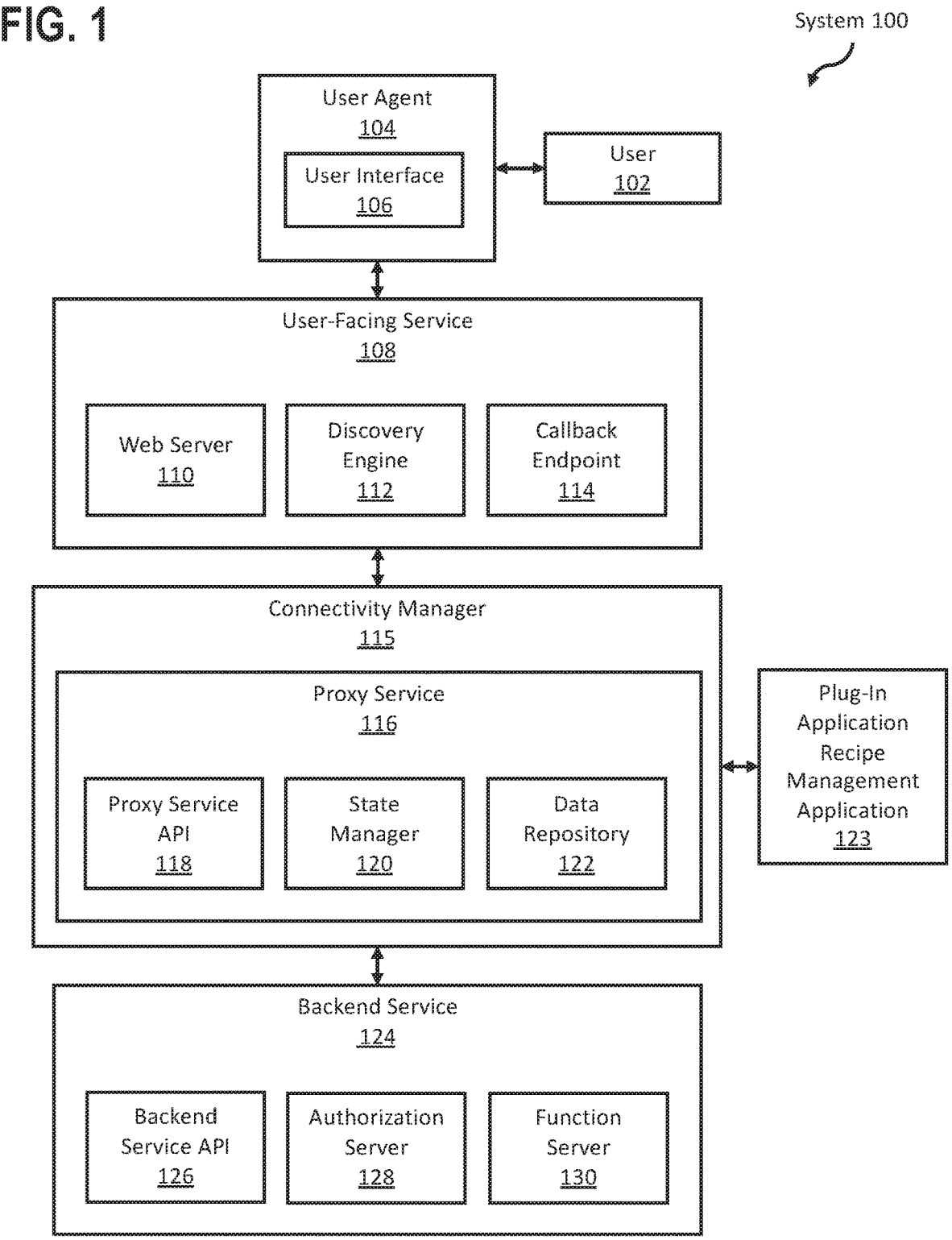

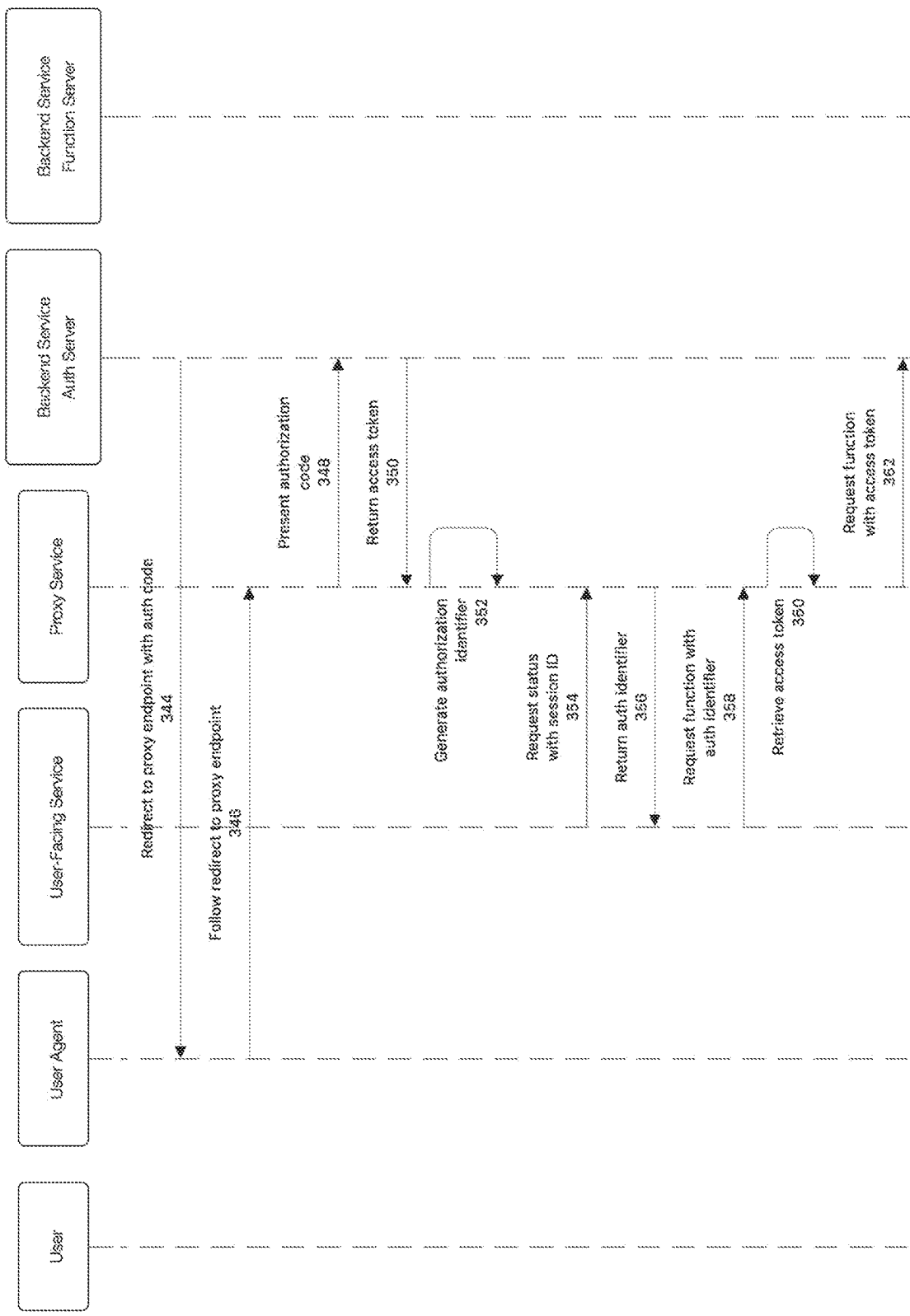

AUTHORIZATION PROXY PLATFORM

BENEFIT CLAIMS; RELATED APPLICATIONS; INCORPORATION BY REFERENCE

This application claims the benefit of U.S. Provisional Patent Application 62/748,105, filed Oct. 19, 2018, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to services. In particular, the present disclosure relates to service authorization.

BACKGROUND

In Internet technology, a user-facing service is a service that a user interacts with directly. A user interacts with a user-facing service via a user agent, such as a web browser, a network-enabled application, and/or any other kind of software agent that communicates with a user-facing service at a user's direction. The user-facing service exposes content and/or functionality to the user, via the user agent. A backend service is a service that supplies additional content and/or functionality to a user-facing service, beyond what the user-facing service is configured to supply independently. In one example, a user-facing image publishing service provides a website that allows a user, via a web browser, to create a personalized photo book. To accept payment for the calendar, the image publishing service integrates with a backend payment processing service. In this example, the user interacts with the payment processing service during a checkout process, when ordering a photo book from the image publishing service. Many different kinds of user-facing services and backend services exist.

To integrate with a backend service, a user-facing service must support security features that the backend service enforces. In many cases, a backend service requires an active account with the backend service. When a user-facing service seeks to access a function of a backend service, the backend service may require authorization. Typically, an authorization process prompts a user to confirm (e.g., via a login interface) that the user's account is active. If the user does not have an active account with the backend service, the backend service may require the user to create an account before proceeding. If the user does not have an active account and/or does not create a new account, authorization may fail.

Multiple standards exist for authorizing a user to use one or more functions of a backend service. OAuth 2.0 is one such standard. Typically, a user-facing service is required to implement all the interactions with a backend service that are needed to support an authorization standard. If a user-facing service integrates with multiple backend services, then the user-facing service is required to implement all the interactions with each of the backend services. Even when using the same standard (e.g., OAuth 2.0), implementation details may vary from one backend service to the next. Different backend services may implement the same authorization standard differently, and/or one or more backend services may not be fully compliant with an authorization standard. As the number of backend services supported by a user-facing service increases, the amount of time, money, and effort required for developers of a user-facing service to implement and support those integrations increases accordingly.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 1 shows a block diagram that illustrates a system in accordance with one or more embodiments;

FIGS. 3A-3D illustrate a sequence diagram in accordance with one or more embodiments.

DETAILED DESCRIPTION

Figure 2A:
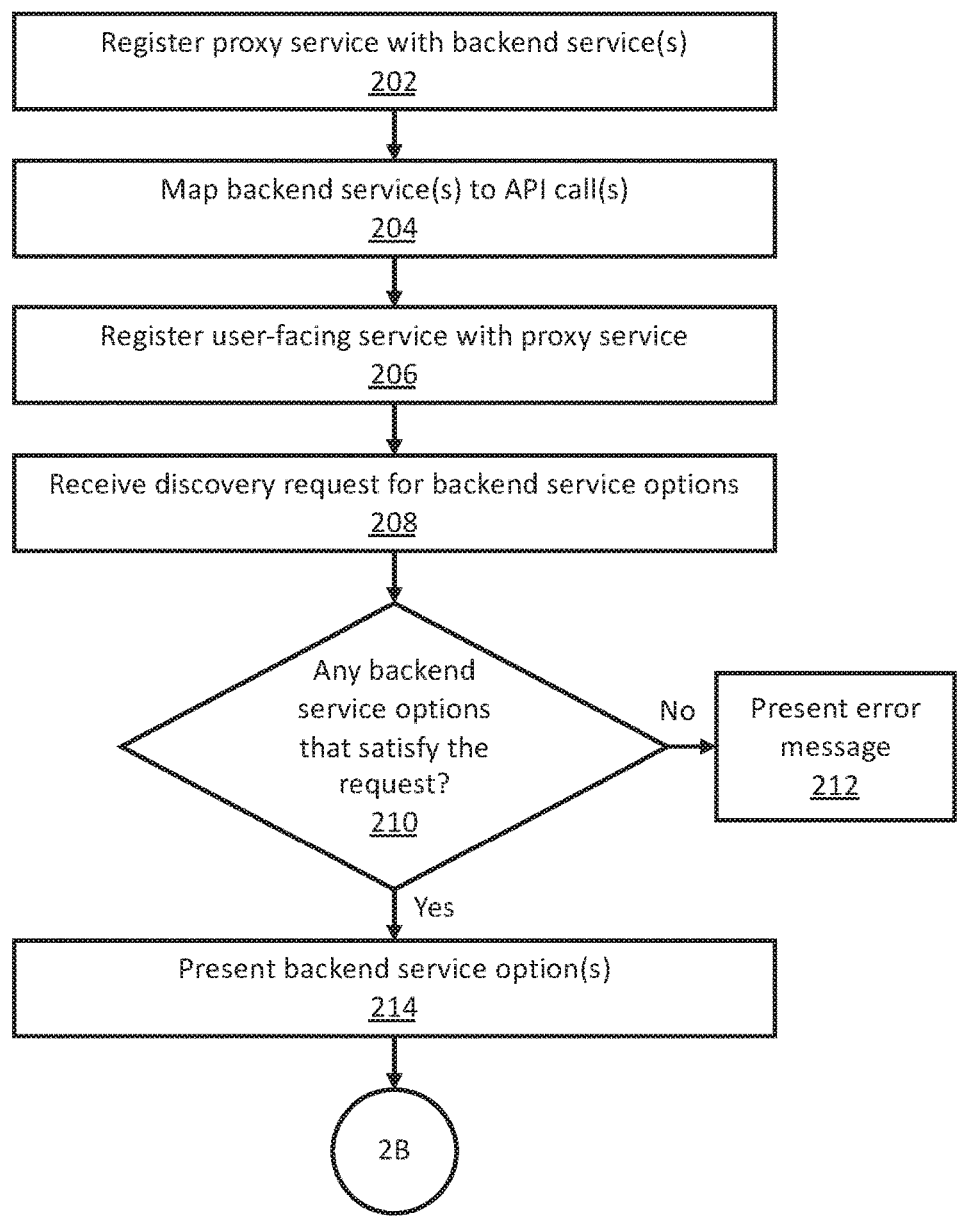
FIGS. 2A-2C illustrate a set of operations for authorization using a proxy service in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. AUTHORIZATION USING A PROXY SERVICE
4. ILLUSTRATIVE EXAMPLE OF AN AUTHORIZATION SEQUENCE
5. GOVERNING USAGE OF A BACKEND SERVICE
6. MISCELLANEOUS; EXTENSIONS
7. HARDWARE OVERVIEW
8. COMPUTER NETWORKS AND CLOUD NETWORKS
9. MICROSERVICE APPLICATIONS

1. General Overview

One or more embodiments include techniques for brokering authorization between a user-facing service, a user of the user-facing service, and a backend service. A proxy service, operating independently of multiple user-facing services and multiple backend services, exposes an application programming interface (API) that is configured to receive requests from the user-facing services to perform functions of the backend services. The proxy service stores user authorization data that authorizes a user of a user-facing service to use a particular function of a backend service. Responsive to a request, via the API, to perform the function for an account associated with the user, the proxy service uses the user authorization data to access the backend service, to perform the function.

In an embodiment, the proxy service obtains an authorization code indicating that a user is authorized to use a function of the backend service. The proxy service generates an authorization session identifier, which it transmits to the user-facing service. The proxy service receives, from the user-facing service, a request to perform the function of the backend service for an account associated with the user. The request includes the authorization session identifier. Responsive to the request, the proxy service determines that the request is authorized. The proxy service transmits, to the backend service, another request to perform the function of the backend service. Responsive to the proxy service's request, the proxy service receives, from the backend service, confirmation that the second request was authorized to perform the function.

In an embodiment, the proxy service governs usage of a backend service, by the user-facing services, according to a usage policy. The proxy service receives a request to perform an function of the backend service and determines that performing the function, based on the request, would violate the usage policy. The proxy service may obtain user input indicating whether to override the usage policy and perform the function, based on the request, in violation of the usage policy.

One or more embodiments described in this Specification and/or recited in the claims may not be included in this General Overview section.

2. Architectural Overview

FIG. 1 shows a block diagram that illustrates a system 100 in accordance with one or more embodiments. As illustrated in FIG. 1, system 100 includes a user 102, user agent 104, user-facing service 108, connectivity manager 115, proxy service 116, plug-in application recipe (PIAR) management application 123, backend service 124, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, the system includes a connectivity manager 115. The connectivity manager 115 is configured to manage connectivity between independently operating services (e.g., one or more user-facing services 108 and/or one or more backend services 124). The connectivity manager 115 centralizes the implementation of connection protocols used by different services, such that the services themselves are not responsible for the implementation details. The connectivity manager 115 may expose an application programming interface (API) (e.g., a Representational State Transfer (REST) API and/or another kind of API) through which the different services transmit connectivity requests and/or supply data to be transmitted from one service to another. The API may be standardized across multiple services, allowing for different configurations of service-to-service connections using the same set of standardized API call(s). One service may connect to another service via the standardized API, rather than directly implementing the underlying protocol(s) needed to connect to that service. Alternatively or additionally, the API may be configured to receive discovery requests and respond to discovery requests with information describing one or more of the different service(s) supported by the connectivity manager 115.

In an embodiment, discoverable information about the service(s) supported by the connectivity manager 115 may include branding data (e.g., logos, descriptions, and/or other branding data) associated with the supported service(s). The connectivity manager 115 may serve as a centralized access point for the branding data, helping to ensure that branding data presented to users of the requesting service(s) is consistent across connections and/or adheres to branding guidelines. When branding data associated with a service changes, a corresponding change may be made at the connectivity manager 115, avoiding duplication of effort.

In an embodiment, a connectivity manager 115 delivers economies of scale, in comparison to implementations of connection protocols that are implemented separately for different services and operating in multiple computer systems. Alternatively or additionally, the connectivity manager 115 may help avoid duplication of effort, saving time and/or money associated with implementing connection protocols separately for different services. Different entities that implement the different services are not required to separately model and implement the API's needed to communicate directly with other services.

In an embodiment, a connectivity manager 115 helps protect entities that provide the different services from disruptions due to changes in other services. For example, if service A communicates directly with service B and service B's API changes (e.g., by changing the existing API and/or exposing an entirely new API), service A must be aware of the API change and implement corresponding changes to communicate with service B's modified API, to avoid disruption in communication between service A and service B. However, if service B communicates with service B via a connectivity manager 115, then the connectivity manager 115 may be able to implement the change needed to communicate with service B's modified API, without requiring any changes in service A's implementation. The change implemented by the connectivity manager 115 may apply to any number of service-to-service communication paths, avoiding the need to replicate the change for each of those paths. Alternatively or additionally, in the event of an unexpected connection failure, a connectivity manager 115 may retry the connection without initially transmitting any error message to the service(s) requesting the connection. The connectivity manager 115 may expose the failure to the requesting service(s) only if one or more retries fail, for example according to a policy that defines a maximum number of retries. Error messages presented by the connectivity manager 115 may conform to a predetermined error message format that is consistent across multiple connections and/or connection types.

In an embodiment, a connectivity manager 115 helps enforce legal and/or organizational communication policies. For example, Twitter prohibits sentiment analysis by government entities. If entities communicate with Twitter via a connectivity manager 115, the connectivity manager 115 may enforce the policy to ensure that government entities do not access sentiment analysis features exposed by Twitter's API. As another example, an organization may prohibit the use of a competitor's service(s). If all services within the organization are required to implement connections with other services via a connectivity manager 115, then the connectivity manager 115 may enforce the restriction against communicating with competing services. A connectivity manager 115 may disable access to a connection that was previously enabled, based on a policy and/or the connection becoming otherwise unavailable. A connectivity manager 115 may help enforce many different kinds of legal and/or organizational policies. Entities may configure their own policies, according to a service level agreement (SLA) with the connectivity manager 115. For example, an SLA may implement data caps to avoid costly and/or performance-degrading data transfer overages. Alternatively or additionally, a connectivity manager 115 may include a data queue and/or other traffic smoothing functionality to help a service comply with a data transfer policy or restriction (e.g., no more than X bytes transferred in a given timeframe, where transferring more than X bytes in that timeframe may result in the sender being blacklisted, shut down, throttled, and/or incur overage fees).

In an embodiment, a connectivity manager 115 includes administrative features that track how the connectivity manager 115 is being used. The connectivity manager 115 may track who (e.g., which user accounts and/or other organizational entities) is/are connecting to services, how much data the different entities are transferring between services, what types of data the entities are transferring, etc. The connectivity manager 115 may monitor usage to detect prohibited and/or abnormal usage, such as a spike in transmission of a particular kind of data typically associated with unauthorized use (e.g., a distributed denial of service (DDoS) attack or another kind of unauthorized use characterized by a spike in data traffic). The connectivity manager 115 may include a messaging service that notifies a user of an actual or potential violation of a policy, allowing the user to decide whether to proceed in violation of the policy. Alternatively or additionally, the connectivity manager 115 may log usage. The connectivity manager 115 may present log data in a user interface that supplies log review and/or usage auditing functions.

In general, in an embodiment, the system 100 includes an authorization proxy platform. An authorization proxy platform is hardware and/or software through which other software-based services (e.g., applications) can obtain, use, and potentially re-use authorization to access data structures, data, metadata, configuration information, services, and/or processes set up and/or maintained for a particular user, optionally based on stored authentication information and/or an authentication token made available to the platform. In this way, the authorization proxy platform provides an ongoing authorization proxy service that is available to consume, without requiring information about the authorization procedures used by the application. Based on just the authentication information, an interface hosted by the platform may connect the user to the service for obtaining an authentication token. The authorization proxy platform may implement any number of authorization protocols, including but not limited to: OAuth 2.0 (2-legged and 3-legged); API key; basic authentication; a custom authentication protocol; and/or another authentication protocol or combination thereof. In an embodiment, the authorization proxy platform operates as part of a connectivity manager 115, as described above. Alternatively, the authorization proxy platform may provide authorization proxying exclusive of other service-to-service connectivity features described herein.

In an embodiment, a user 102 is an entity (e.g., an individual, a corporate entity, or a service implemented in hardware and/or software) that interacts with a user-facing service 108 via a user agent 104. A user 102 may or may not be a human user. A user 102 may represent the access grants and restraints associated with a particular account on an application, as distinct from other accounts on the application that have different access grants and restraints. A user agent 104 may be a web browser, network-enabled application, and/or any other kind of software agent that communicates with a user-facing service at a user's direction. In an embodiment, a user agent 104 presents a user interface 106, rendered based on instructions supplied by the user-facing service, to a user 102. The user interface 106 refers to hardware and/or software configured to facilitate communications between a user and a user facing service 108. User interface 106 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the user interface 106 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface 106 is specified in one or more other languages, such as Java, C, or C++.

In an embodiment, a user-facing service 108 is a service that a user 102 interacts with directly, by supplying user input to the user agent 104. A user-facing service 108 may be a software-as-a-service (SaaS) application. Examples of user-facing services 108 include, but are not limited to, cloud-based productivity tools (e.g., word processors, spreadsheets, email, presentations, calendars, task management, etc.), document storage (e.g., cloud-based document synchronization and/or backup tools), customer relationship management (CRM) tools, audio- and/or video-conferencing, storefronts, social media, games, or any other kind of service that is accessible via a user agent 108, or combination thereof.

In an embodiment, a user-facing service 108 includes a web server 110. A web server 110 generates instructions (e.g., hypertext markup language (HTML)) that the user agent 106 uses to render a user interface 106. The web server 110 may include server-side instructions that, when executed, cause the user-facing service 108 to communicate with a proxy service 116.

In an embodiment, a user-facing service 108 includes a discovery engine 112. The discovery engine 112 is configured to transmit discovery requests to a proxy service 116. Responsive to discovery requests, the proxy service 116 returns information about which backend services 124 the proxy service 116 supports.

In an embodiment, a user-facing service 114 includes a callback endpoint 114. A callback endpoint 114 is an application programming interface (API) that is accessible to a proxy service 116. The proxy service 116 may access the callback endpoint 114 to inform the user-facing service 114 when a particular resource is available, when a requested operation is complete, and/or when an error has occurred. The callback endpoint 114 may be a uniform resource identifier (URI), such as a uniform resource locator (URL), or any other kind of URI or combination thereof.

In an embodiment, a proxy service 116 refers to hardware and/or software configured to perform operations described herein for brokering authorization between a user 102, a user-facing service 108, and a backend service 124. Examples of operations for brokering authorization are described below. In an embodiment, the proxy service 116 is a multi-tenant system. A tenant is a corporation, organization, enterprise or other entity that accesses a shared computing resource, such as the proxy service 116. In an embodiment, tenants are independent from each other. A business or operation of one tenant is separate from a business or operation of another tenant. A tenant may subscribe to the proxy service 116 (e.g., for a monthly or annual fee), to obtain access to authentication brokering services provided by the proxy service 116.

In an embodiment, a proxy service 116 includes a proxy service application programming interface (API) 118. The proxy service API 118 is an interface that is accessible to a user-facing service 108. The user-facing service 108 may access the proxy service API 118 to register the user-facing service 108 as a client of the proxy service 116, submit a discovery request, submit an authorization request, submit a request to perform one or more functions of a backend service 124, and/or submit any other kind of request for operations that are exposed, by the proxy service 116, via the proxy service API 118. The proxy service 116 may include multiple API's that are accessible for different purposes.

In an embodiment, the proxy service API 118 defines a standard interface for a user-facing service 108 to access content and/or other functionality of multiple backend services (not shown). Different backend services may use different authorization standards. Alternatively or additionally, different backend services may implement the same authorization standard differently. Alternatively or additionally, one or more backend services may not be fully compliant with an authorization standard. In an embodiment, the proxy service 116 handles the idiosyncrasies of communicating with the different backend services. The proxy service API 118 provides a layer of abstraction that shields the user-facing service 108 from those idiosyncrasies. The user-facing service 108 may only be required to implement instructions for communicating with the proxy service API 118.

In an embodiment, a proxy service 116 includes a state manager 120. The state manager 120 refers to hardware and/or software configured to generate and manage state data that uniquely identifies a particular authorization session. To uniquely identify a particular authorization session, the state manager 120 may be configured to generate a unique authorization session identifier (e.g., a unique string of alphanumeric characters). The proxy service 116 may be configured to map the authorization session identifier to other data that is associated with the particular authorization session. In this context, an authorization session refers to a sequence of operations in which a proxy service 116 brokers authorization between a user 102, a user-facing service 108, and a backend service 124.

In an embodiment, a proxy service 122 includes a data repository 122. The proxy service 112 may use the data repository 122 to store state data, including authorization data (e.g., authorization codes, authorization tokens, client identifiers, client secrets, and/or another kind of authorization data or combination thereof), and/or any other kind of information used in brokering authentication, or combination thereof. A data repository 122 may include any kind of storage unit and/or device (e.g., a file system, database, collection of tables, or any other storage mechanism) for storing data. Further, a data repository 122 may include multiple different storage units and/or devices. The multiple different storage units and/or devices may or may not be of the same type or located at the same physical site. Further, a data repository 122 may be implemented or may execute on the same computing system as one or more other components of the system 100. Alternatively or additionally, a data repository 122 may be implemented or executed on a computing system separate from one or more other components of the system 100. A data repository 122 may be communicatively coupled to another component of the system 100 via a direct connection or via a network.

In an embodiment, a backend service 124 is a service that supplies additional content and/or functionality to a user-facing service 108, beyond what the user-facing service 108 is configured to supply independently. A backend service 124 may be a SaaS provider, platform-as-a-service (PaaS) provider, infrastructure-as-a-service (IaaS) provider, or any other kind of service provider that supplies content and/or other functionality to a user-facing service 108. A backend service 124 may be associated with a different user-facing service (not shown) that is operated by the same entity as the backend service 124. In this discussion, the user-facing service 108, proxy service 116, and backend service 124 are assumed to be operated by different entities (e.g., different commercial entities).

In an embodiment, a backend service 124 includes a backend service application programming interface (API) 126. The backend service API 126 is an interface that is accessible to a proxy service 116. The proxy service 116 may access the backend service API 126 to register the proxy service 116 as a client of the backend service 124, submit an authorization request, submit a request to perform one or more functions of the backend service 124, and/or submit any other kind of request for operations that are exposed, by the backend service 124, via the backend service API 126. The backend service 124 may include multiple API's that are accessible for different purposes.

In an embodiment, a backend service 124 includes an authorization server 128. The authorization server 128 refers to hardware and/or software configured to perform authorization operations, responsive to authorization requests submitted by a proxy service 116. Alternatively or additionally, the authorization server 128 may be configured to authorize credentials supplied by a user 102 via a user agent 104.

In an embodiment, a backend service 124 includes a function server 130. The function server 130 is configured to supply content and/or perform other functions of the backend service 124, responsive to requests submitted by the proxy service 116. The function server 130 may supply content and/or perform other functions subject to authorization by the authorization server 128.

In an embodiment, a plug-in application recipe ("PIAR") management application 123 executes PIAR's based on one or more PIAR definitions. A PIAR is a set that includes a triggering event (referred to herein as a "trigger" or "trigger condition") and an action, arranged logically as an if-then formulation. The "if" portion of the formulation corresponds to a PIAR trigger condition. The "then" portion of the formulation is conditioned on the "if" portion being satisfied, and corresponds to a triggerable action. A plug-in application may supply the action. A plug-in application that supplies an action may be the same as, or different than, a plug-in application that supplies a trigger.

A PIAR management application 123 may be used for many purposes. For example, a PIAR management application 123 may be used to automate repetitive tasks. Examples of PIARs include, but are not limited to: (a) responsive to detecting that a user's car is in the user's driveway (trigger), opening the user's garage door (action); (b) responsive to determining that a user's walked steps have not reached a particular goal by 5 p.m. (trigger), transmitting a notification to the user (action); (c) responsive to detecting a new sales contact in an address book or email (trigger), creating a new folder to store information about the sales contact (action).

In an embodiment, the PIAR management application 123 presents an interface that allows a user to define PIAR's. A PIAR definition indicates one or more actions to be executed by the PIAR management application. A PIAR definition further indicates a trigger of a plug-in application. When the PIAR management application 123 detects that a trigger condition is satisfied, the PIAR executes the action(s) corresponding to the detected trigger. In an embodiment, the PIAR management application 123 includes features described in U.S. patent application Ser. No. 15/994,346, titled "Managing a Plug-In Application via an Interface," filed May 31, 2018 and incorporated herein by reference.

The term "plug-in application" refers to the fact that an application's trigger(s) and/or action(s) logically 'plug in' to a PIAR management application 123 and thus become part of a PIAR's logic. For example, a PIAR management application 123 may be organized according to a microservices architecture, such that several independent services are plugged into the PIAR management application 123. A plugged-in service may provide monitoring service(s) specific to a particular application, to support trigger(s) for the particular application. Alternatively or in addition, a plugged-in service may provide action service(s) specific to a particular application, to support executing action(s) for that particular application.

In an embodiment, a user-facing service 108 is a plug-in application that supplies an action and/or a trigger for a PIAR executed by the PIAR management application 123. Alternatively or additionally, a backend service 124 may be a plug-in application that supplies an action and/or a trigger for a PIAR executed by the PIAR management application 123. The connectivity manager 115 may be configured to manage connectivity between two or more plug-in applications. Specifically, in an embodiment, the proxy service 116 stores authentication data that allows the proxy service 116 to authenticate, on an ongoing basis, connectivity between two or more plug-in applications during execution of a PIAR by the PIAR management application 123.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Authorization Using a Proxy Service

Figure 2B:
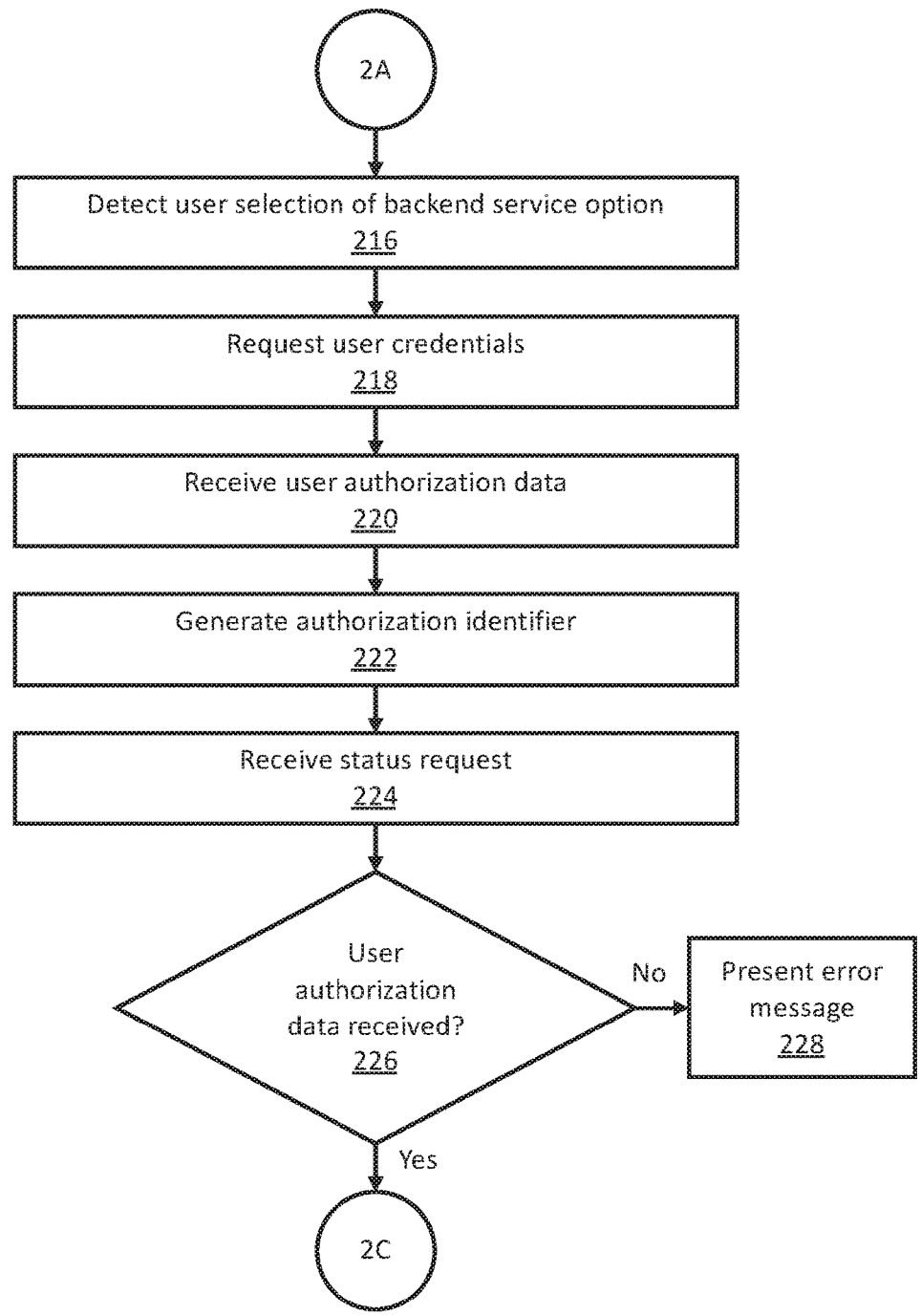
Figure 2C:
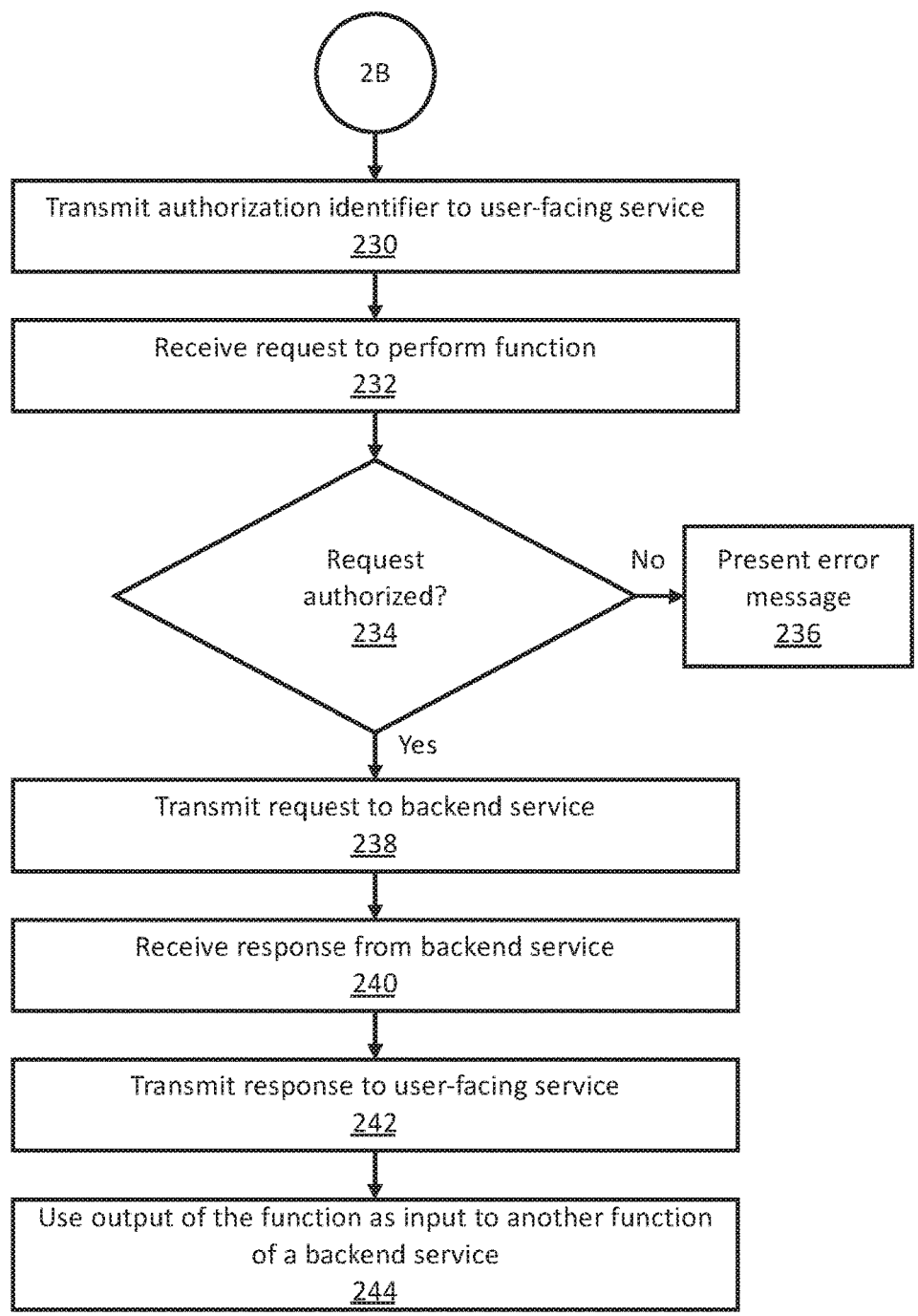
Figure 3A:
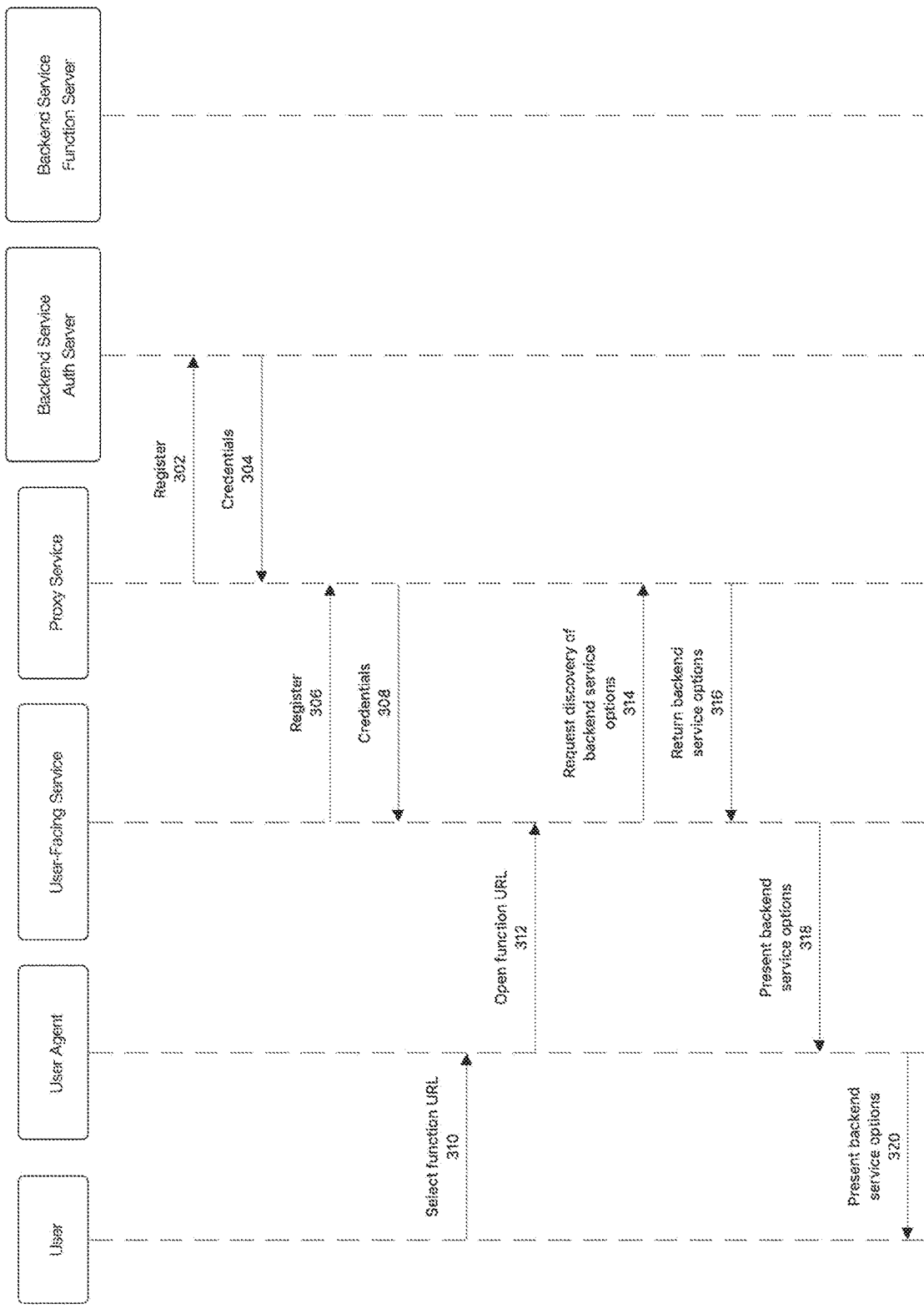
Figure 3B:
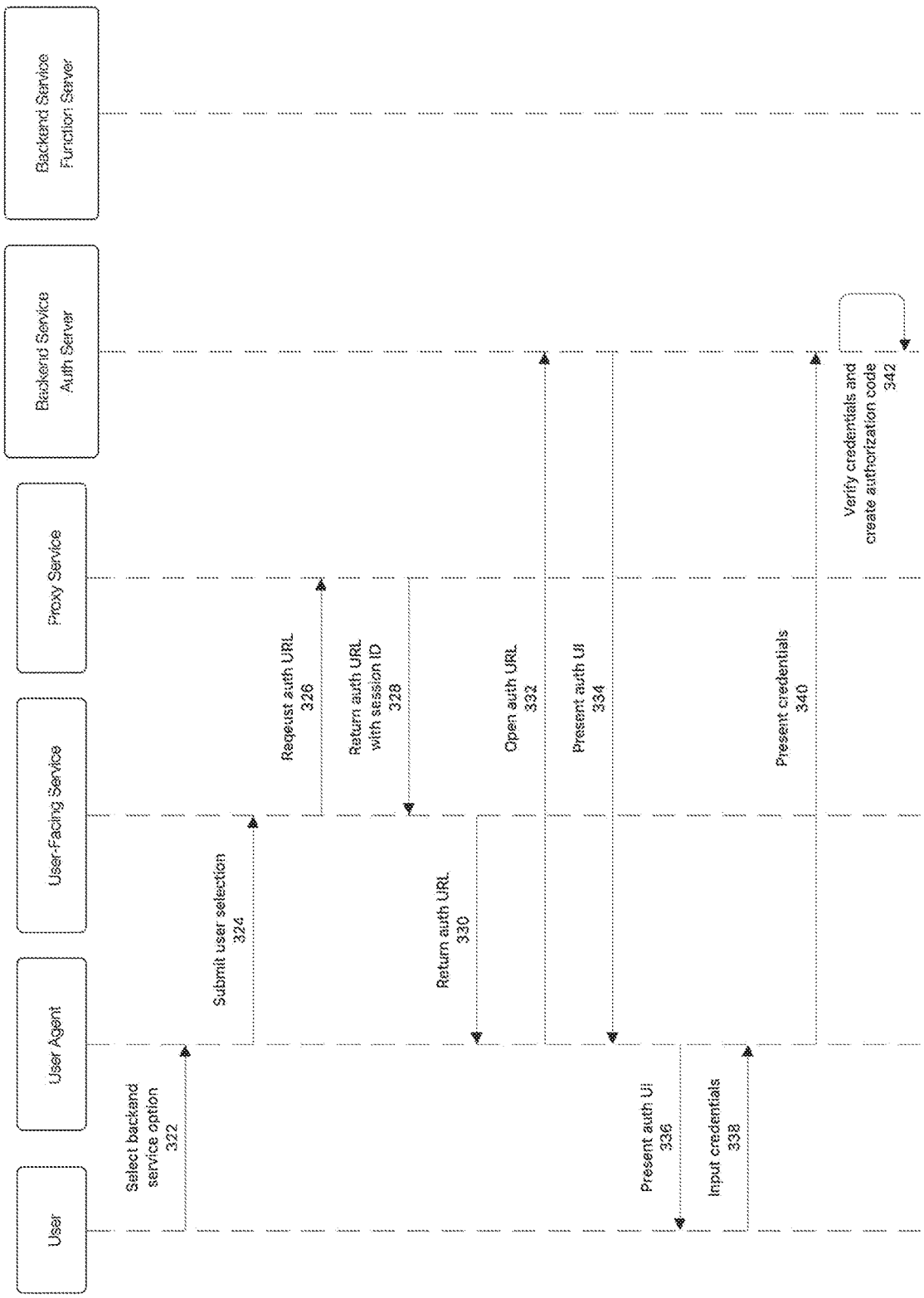
Figure 3D:
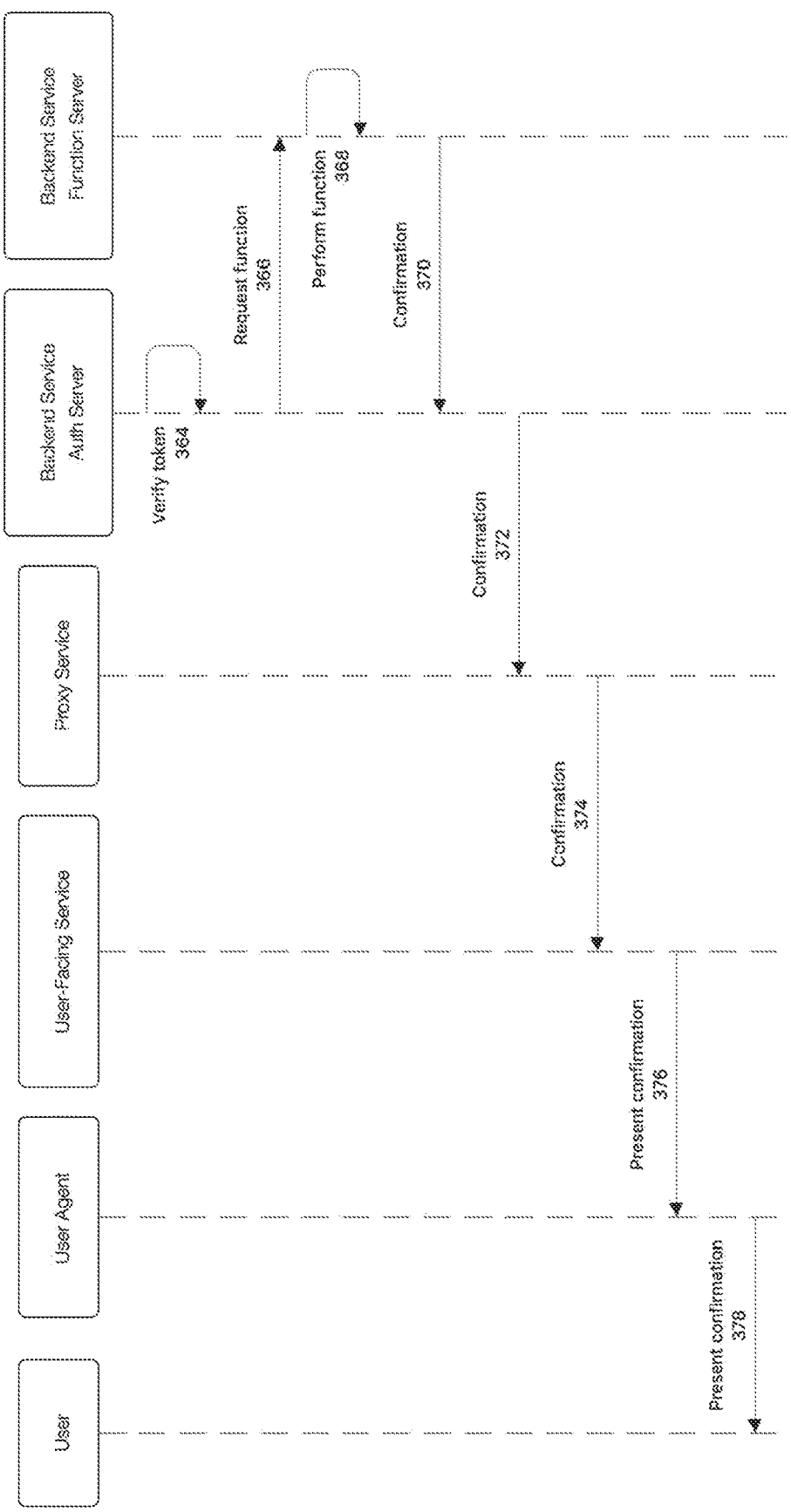

FIGS. 2A-2C illustrate a set of operations for authorization using a proxy service in accordance with one or more embodiments. One or more operations illustrated in FIGS. 2A-2C may be modified, rearranged, or omitted all together. Accordingly, the particular sequence of operations illustrated in FIGS. 2A-2C should not be construed as limiting the scope of one or more embodiments.

In an embodiment, a proxy service is registered with one or more backend services (Operation 202). Registering the proxy service with the backend service authorizes the proxy service, as a client of the backend service, to access one or more operations exposed by the backend service. To authorize as a client of the backend service, the proxy service may submit a registration request to the backend service's authorization server. Responsive to the registration request, the authorization server may supply credentials that are uniquely associated with the proxy service. The credentials may include a unique client identifier, a client secret, and/or any other kind of credentials or combination thereof. The proxy service may supply the credentials when submitting requests to the backend service. In an embodiment, registering as a client of the backend service to perform authorization operations that a user-facing service would otherwise be required to implement. When the proxy service registers as a client of the backend service, the proxy service may supply a redirect uniform resource locator (URL). The backend service may use the redirect URL to supply an authorization code to the proxy service, as described below. The user-facing service may not be required to register as a client of the backend service.

In an embodiment, the proxy service maps one or more backend services to application programming interface (API) calls exposed by the proxy service (Operation 204). Mapping a backend service to an API call generates a record (e.g., a database field, XML tag, file, and/or another kind of record or combination thereof) indicating that the backend service is an option available for that API call. For example, the proxy service may map a backend service that exposes payment processing options to an API call for requesting payment processing operations. The proxy service may map multiple backend services to the same API call. The multiple mappings may correspond to a catalog of backend service options available for that API call.

In an embodiment, a user-facing service is registered with the proxy service (Operation 206). Registering a user-facing service with the proxy service authorizes the user-facing service, as a client of the proxy service, to access authorization proxying functions of the proxy service. To authorize as a client of the proxy service, the user-facing service may submit a registration request to the proxy service. Responsive to the registration request, the proxy service may supply credentials that are uniquely associated with the user-facing service. The credentials may include a unique client identifier, a client secret, and/or any other kind of credentials or combination thereof. The user-facing service may supply the credentials when submitting requests to the proxy service. In an embodiment, registering as a client of the proxy service allows the user-facing service to access content and/or other functionality of the backend service, without the user-facing service being required to register as a client of the backend service. Alternatively or additionally, registering as a client of the proxy service may allow the user-facing service to access multiple backend services supported by the proxy service. In an embodiment, as a client of the proxy service, the user-facing service is not required to implement instructions for communicating directly with the backend service during an authentication session.

In an embodiment, the proxy service receives a request for backend service options, from a user-facing service (Operation 208). The proxy service may support multiple backend services (e.g., multiple backend service options for a particular operation, such as payment processing). The proxy service may receive a request to discover the backend service options. In an embodiment, the proxy service determines whether the proxy service supports any backend service options that satisfy the request (Operation 210). For example, if a discovery request is for all supported backend services that provide payment processing, the proxy service may determine whether the proxy service is registered with any backend services that provide payment processing. If the proxy service does not support any backend service options that satisfy the request, then the proxy service may present an error message responsive to the discovery request (Operation 212).

In an embodiment, if the proxy service supports at least one backend service that satisfies the request, the proxy service presents information about the supported backend service(s) responsive to the request (Operation 214). The proxy service may supply information about the backend service options in extensible markup language (XML), JavaScript Object Notation (JSON), or any other kind of format, or combination thereof. In an embodiment, the information includes one or more uniform resource locators (URL's) that correspond, respectively, to requests for interfaces that allow a user to supply credentials for whichever backend service option the user selects.

In an embodiment, the proxy service detects a user selection of a backend service option (Operation 216). For example, the proxy service may detect that the user has selected a URL corresponding to a particular backend service for performing a backend service function (e.g., payment processing) proxied by the proxy service. The selected URL may correspond to a request for an interface (e.g., a web page) that allows the user to supply credentials (e.g., a login and password) to the backend service, to confirm that the user is authorized to access the function of the selected backend service.

In an embodiment, responsive to detecting the user selection, the proxy service may request user credentials (Operation 218). The requested user credentials may verify that the user is authorized to access the function of the selected backend service. For example, the backend service may transmit instructions, to the user-facing service, to access an authorization interface associated with the selected backend service. In an embodiment, when the user supplies credentials in the interface, the credentials are submitted to the backend service directly and not to the proxy service. Proxying an authorization flow may avoid exposing the user's credentials directly to the proxy service.

In an embodiment, the proxy service receives user authorization data (Operation 220). The user authorization data indicates that the user has supplied valid credentials, confirming that the user is authorized to access the function of the selected backend service. In an embodiment, the proxy service receives the user authorization data from the backend service. The user authorization data may correspond to an authorization code associated with the user's provision of valid credentials. The user authorization data may trigger the proxy service to continue handling the corresponding authorization session.

In an embodiment, the proxy service generates an authorization identifier (Operation 222) associated with the authorization session. The authorization identifier is an identifier that the proxy service supplies to the user-facing service without exposing underlying user authorization data. For example, responsive to receiving an authorization code from the backend service, the proxy service may transmit the authorization code back to the backend service and receive an access token. The access token may be a multi-use token that permits the proxy service to request backend service functions for the user account authenticated by the user-facing service, via the proxy service directly interacting with the backend service. The access token (and/or the authorization code associated with the access token) may be available for consumption by the same instance of the same user-facing service, at different times, by using an authenticated session between that user-facing service and the proxy platform. Alternatively or additionally, the access token (and/or the authorization code associated with the access token) may be available for consumption by multiple different instances of the same user-facing service, including an instance that did not initially request authorization, as long as each instance is able to supply valid credentials (e.g., an authorization session identifier, a client identifier, and/or a client secret or another kind of credential or combination thereof) to the proxy service. Alternatively or additionally, the access token (and/or the authorization code associated with the access token) may be available for consumption by multiple different user-facing services representing interfaces independently and separately maintained by different entities, as long as each user-facing service is able to supply valid credentials (e.g., an authorization session identifier, a client identifier, and/or a client secret or another kind of credential or combination thereof) to the proxy service. The proxy service may map the access token to a particular 'account,' i.e., a distinct set of credentials, associated with the authorization session. As described herein, the user-facing service may access the account to request performance of a function of the backend service. The proxy service may generate a unique authorization identifier and map the authorization identifier to the access token. The proxy service may subsequently use the authorization identifier to lookup the access token, as described below.

In an embodiment, the proxy service receives a status request from the user-facing service (Operation 224). Specifically, the user-facing service may request whether the user has been authorized to use the requested function of the backend service (e.g., if the proxy service has received an authorization code associated with the authorization session). To request the status of the authorization session, the user-facing service may periodically poll the proxy service's API with an authorization session identifier. Alternatively, to request the status of the authorization session, the user-facing service may supply a callback endpoint (e.g., a callback URL) to the proxy service.

In an embodiment, the proxy service determines whether authorization data was received (Operation 226). The proxy service may determine whether authorization data was received responsive to a status request (e.g., Operation 224) and/or at periodic intervals. If authorization data was not received, the proxy service may present an error message (Operation 228). If authorization data was received, the proxy service may transmit an authorization identifier to the user-facing service (Operation 230), responsive to a status request and/or to a callback endpoint supplied by the user-facing service.

In an embodiment, the proxy service receives a request to perform a function of a backend service (Operation 232). Responsive to the request, the proxy service may determine whether the request is authorized (Operation 234). For example, the request may include an authorization identifier and/or access token that the proxy service previously provided to the user-facing service. If the request includes an authorization identifier and does not include an access token, the proxy service may use the authorization identifier to perform a lookup and retrieve the access token. Based on the authorization identifier and/or access token, the proxy service may determine whether the user account associated with the request is authorized to access the requested function of the backend service. If the request is not authorized, the proxy service may present an error message (Operation 236).

In an embodiment, if the request is authorized, then the proxy service transmits a request to the backend service, to perform the requested function (Operation 238). The request submitted by the proxy service to the backend service may include an access token and/or other user authorization data that provides access by the proxy service to the requested function of the backend service.

In an embodiment, the proxy service receives a response from the backend service (Operation 240). The response may indicate whether the function was performed successfully. If the function was not performed successfully, the response may include an error message. If the function was performed successfully, the response may include output of the function. For example, if the function is a payment processing function, the response may include a confirmation number corresponding to a completed payment. If the function is a request for data, the response may include the requested data. In an embodiment, the proxy service transmits the response (and/or information generated by the proxy service corresponding to the response) to the user-facing service (Operation 242).

In an embodiment, the proxy service provides authorization proxying during execution of a plug-in application recipe (PIAR), as described above. The backend service may be an action application and the requested function of the backend service may be an action performed responsive to a trigger defined for a particular PIAR. In an embodiment, the PIAR includes a sequence of two or more actions. A PIAR management application may use an output of the backend service's function, obtained using authorization proxying operations described herein, as input to another backend service function (Operation 244). The subsequent backend service function may be the same function or a different function, and may be a function of the same backend service or a different action application.

4. Illustrative Example of an Authorization Sequence

FIGS. 3A-3D illustrate a sequence diagram in accordance with one or more embodiments. One or more operations illustrated in FIGS. 3A-3D may be modified, rearranged, or omitted all together. Alternatively or additionally, one or more operations illustrated in FIGS. 3A-3D may be performed by different components than those illustrated in FIGS. 3A-3D. Accordingly, the particular sequence of operations illustrated in FIGS. 3A-3D should not be construed as limiting the scope of one or more embodiments.

In the following example, for illustrative purposes only, the user-facing service is assumed to be a web-based image publishing service that allows a user, via a web browser, to create a personalized photo book. The backend service is assumed to be a payment processing service. This example illustrates operations for proxying an OAuth 2.0 authorization flow. One or more operations described in this example may be used to proxy another kind of authorization flow. This illustrative example should not be construed as limiting the scope of one or more embodiments.

In an embodiment, a proxy service registers as a client of a backend service. To authorize as a client of the backend service, the proxy service may submit a registration request to the backend service's authorization server (Operation 302) (hereinafter referred to as the 'authorization server'). Responsive to the registration request, the authorization server supplies credentials that are uniquely associated with the proxy service (Operation 304). The credentials may include a unique client identifier, a client secret, and/or any other kind of credentials or combination thereof. The proxy service may supply the credentials when submitting requests to the backend service. In an embodiment, registering as a client of the backend service to perform authorization operations that a user-facing service would otherwise be required to implement. When the proxy service registers as a client of the backend service, the proxy service may supply a redirect uniform resource locator (URL). The backend service may use the redirect URL to supply an authorization code to the proxy service, as described below. The user-facing service may not be required to register as a client of the backend service. Alternatively or additionally, the proxy service may register with multiple backend services. The proxy service may provide support for multiple backend services to one or more user-facing services.

In an embodiment, the proxy service exposes an interface (e.g., a user interface or API) for a user-facing service to 'onboard' a backend service. Specifically, an administrator (e.g., a developer, systems administrator, or some other kind of administrator) of the user-facing service may register the user-facing service with the backend service. The proxy service may receive, via the interface, credentials associated with the registration process. The proxy service may use the credentials to broker an authorization process, as described herein, to perform a function of the backend service. An 'onboarded' backend service may supplement a catalog of backend services already supported by the proxy service.

In an embodiment, a user-facing registers as a client of the proxy service. To authorize as a client of the proxy service, the user-facing service may submit a registration request to the proxy service (Operation 306). Responsive to the registration request, the proxy service supplies credentials that are uniquely associated with the user-facing service (Operation 308). The credentials may include a unique client identifier, a client secret, and/or any other kind of credentials or combination thereof. The user-facing service may supply the credentials when submitting requests to the proxy service. In an embodiment, registering as a client of the proxy service allows the user-facing service to access content and/or other functionality of the backend service, without the user-facing service being required to register as a client of the backend service. Alternatively or additionally, registering as a client of the proxy service may allow the user-facing service to access multiple backend services supported by the proxy service. In an embodiment, as a client of the proxy service, the user-facing service is not required to implement instructions for communicating directly with the backend service during an authentication session.

In an embodiment, a user selects, via a user agent, a function (i.e., content and/or other functionality) that requires access to a backend service. If the user agent is a web browser, the user may select a URL corresponding to the particular function (Operation 310). In the illustrative example, the user selects a URL to check out, i.e., pay for the personalized photo book. The user agent receives the user input and accesses a resource, hosted by the user-facing service, that corresponds to the requested function. In the illustrative example, the web browser opens a URL, hosted by the image publishing service, corresponding to a checkout web page (Operation 312).

In an embodiment, the proxy service supports multiple backend services. In the illustrative example, the proxy service supports multiple payment methods provided by different backend services. The user-facing service may transmit a request, to the proxy service, to discover the backend service options (Operation 314). Responsive to the discovery request, the proxy service may return information about the backend service options supported by the proxy service (Operation 316). The proxy service may supply information about the backend service options in extensible markup language (XML), JavaScript Object Notation (JSON), or any other kind of format, or combination thereof. The user-facing service processes the response and presents, to the user agent, instructions for rendering a user interface that indicates the backend service options (Operation 318). The user agent presents the options to the user, by rendering the user interface according to the instructions (Operation 320). In the illustrative example, the user interface includes multiple URL's, each corresponding to a different payment method.

In an embodiment, the user selects a particular backend service option from the options presented (Operation 322). In the illustrative example, the user selects a URL corresponding to a particular payment method. The user agent submits the user's selection to the user-facing service (Operation 324). When a user selects a particular backend service option, the system may require the user to supply credentials, to confirm that the user is authorized to use the function of the selected backend service. Based on the user's selection, the user-facing service may query the proxy service for instructions to access an authorization interface corresponding to the selected backend service. In the illustrative example, the user-facing service requests an authorization URL corresponding to the selected payment method (Operation 326). In an embodiment, the proxy service stores multiple authorization URL's corresponding to the different backend services supported by the proxy service.

In an embodiment, the proxy service responds to the user-facing service's request with instructions to access the authorization interface. In the illustrative example, the proxy service returns a URL of an authorization webpage (Operation 328). In an embodiment, the proxy service's response includes an authorization session identifier. As noted above, the proxy service may include a state manager configured to generate authorization session identifiers. The user-facing service may store the authentication session identifier and subsequently use the authorization session identifier to continue an authorization session, as described below. In the illustrative example, the authorization session identifier is included, as a parameter, in URL's that are transmitted between the user agent, proxy service, and/or backend service.

In an embodiment, responsive to the request from the user agent, the user-facing service returns the instructions to access the authorization interface. In the illustrative example, the user-facing service returns the authorization URL corresponding to the selected payment method (Operation 330). The user agent accesses the authorization interface according to the instructions. In the illustrative example, the user agent opens the authorization URL (Operation 332), requesting the web page content from the backend service. The backend service responds by presenting, to the user agent, a user interface (UI) for authorizing the user (Operation 334). In the illustrative example, the backend service supplies instructions (e.g., HTML) to render an authorization webpage. The user agent presents the authorization UI to the user, e.g., by rendering the web page (Operation 336). In an embodiment, user agent presents the authorization UI in a popup window, to avoid interrupting the operational flow of the user-facing service.

In an embodiment, the authorization UI includes information about a scope of function(s) of the backend service to be authorized. The backend service may support multiple functions and/or options within a particular function. An authorization scope may limit the authorization to a subset of functions and/or a subset of options within a particular function. In the illustrative example, the payment processing service includes a function to charge a user's credit card and another function to debit a user's bank account. The authorization scope may limit the authorization to charge the user's credit card. Many different authorization scopes are possible for different kinds of backend services. In an embodiment, the authorization UI allows the user to edit the authorization scope. Alternatively, the authorization UI may present information about an authorization scope that the user is unable to edit.

In an embodiment, the user inputs credentials into the authorization UI (Operation 338). If the user already has an account with the backend service, the user may enter a login and password corresponding to that account. If the user does not already have an account, the user may create a new account. Alternatively, the authorization UI may include an option for the user to continue in 'guest' mode, without creating an account. The backend service may control the specific authorization requirements, including how those requirements are presented in the authorization UI. The user-facing service and/or proxy service may not have any access to, or control over, the contents of the authorization UI.

In an embodiment, the user agent presents (e.g., submits via Hyper Text Transfer Protocol Secure (HTTPS)) the user's credential to the backend service (Operation 340). The backend service verifies the credentials and, if the user is authorized to use the function of the backend service, creates an authorization code (Operation 342). The authorization code is a unique code that indicates the user is authorized to use the requested function of the backend service.

In an embodiment, the backend service transmits a redirect instruction to the user agent, to redirect the user agent to an endpoint of the proxy service (Operation 344). The user agent executes the redirect instruction, to 'follow' the redirect to the endpoint (Operation 346). In the illustrative example, the redirect instruction is an HTTP redirect, with the authorization code embedded in the URL as a parameter. In an embodiment, the endpoint of the proxy service is a particular URI exposed as part of the proxy service's API. The endpoint may be a redirect URL that the proxy service supplied to the backend service when registering as a client of the backend service. If the proxy service supports multiple backend services, the proxy service may use a single endpoint for two or more different backend services.

In an embodiment, the redirect instruction includes the authorization code generated by the backend service. The proxy service may present the authorization code to the backend service (Operation 348). Responsive to receiving the authorization code, the backend service returns an access token (Operation 350). In an embodiment, the access token is a multi-use token that permits the proxy service to request backend service functions for the user account authenticated by the front-end service, via the proxy service directly interacting with the backend service. The access token (and/or the authorization code associated with the access token) is available for consumption by the same instance of the same user-facing service, at different times, by using an authenticated session between that user-facing service and the platform. Alternatively or additionally, the access token (and/or the authorization code associated with the access token) may be available for consumption by multiple different instances of the same user-facing service, including an instance that did not initially request authorization, as long as each instance is able to supply valid credentials (e.g., an authorization session identifier, a client identifier, and/or a client secret or another kind of credential or combination thereof) to the proxy service. Alternatively or additionally, the access token (and/or the authorization code associated with the access token) may be available for consumption by multiple different user-facing services representing interfaces independently and separately maintained by different entities, as long as each user-facing service is able to supply valid credentials (e.g., an authorization session identifier, a client identifier, and/or a client secret or another kind of credential or combination thereof) to the proxy service.

The proxy service may map the access token to a particular 'account,' i.e., a distinct set of credentials, associated with the authorization session. As described herein, the user-facing service may access the account to request performance of a function of the backend service. In an embodiment, the proxy service generates a unique authorization identifier (Operation 352) and maps the authorization identifier to the access token. The proxy service may subsequently use the authorization identifier to lookup the access token, as described below.

In an embodiment, the user-facing service requests a status of the authorization session (Operation 354). Specifically, the user-facing service may request whether the user has been authorized to use the requested function of the backend service (e.g., if the proxy service has received an authorization code associated with the authorization session). To request the status of the authorization session, the user-facing service may periodically poll the proxy service's API with the authorization session identifier. Responsive to the request, the proxy service may return a unique authorization identifier mapped to the corresponding access token (Operation 356), and/or may return the access token itself. Alternatively, to request the status of the authorization session, the user-facing service may supply a callback endpoint (e.g., a callback URL) to the proxy service. When the user has been authorized, the proxy service may transmit a confirmation message to the callback endpoint. The confirmation message may include an authorization identifier and/or access token. Alternatively or additionally, the confirmation message may include the corresponding authorization session identifier.

In an embodiment, after the user-facing service has confirmed (e.g., via polling and/or a callback endpoint as described above) that the user is authorized to use the requested function of the backend service, the user-facing service requests performance of the function. Specifically, the user-facing service transmits a request to the proxy service (Operation 358). The request may include the authorization identifier and/or access token that the proxy service previously provided to the user-facing service. If the request includes an authorization identifier and does not include an access token, the proxy service may use the authorization identifier to perform a lookup and retrieve the access token (Operation 360). In an embodiment, based on the request from the user-facing service, the proxy service submits a request to the backend service, to perform the function (Operation 362). The request may include the access token.

In an embodiment, the backend service's authorization server verifies the access token (Operation 364). If the access token is valid, then the authorization server may transmit a request to the backend service's function server (Operation 366), to perform the function. The function server performs the function (Operation 368). Specifically, the function server supplies the content and/or other functionality indicated by the request. Many different techniques exist for confirming performance of a function. In the illustrative example, the function server transmits a confirmation message to the authorization server (Operation 370). The authorization server transmits a confirmation message to the proxy service (Operation 372). The proxy service transmits a confirmation message to the user-facing service (Operation 374). Based on the confirmation message, the user-facing service generates an interface (e.g., an HTML webpage) indicating that the function has been performed. The user-facing service presents instructions for rendering the interface to the user agent (Operation 376). The user agent executes the instructions to render the webpage and present the confirmation to the user (Operation 378).

In an embodiment, access tokens are valid for a limited period of time. Without the proxy service, the user-facing service would be required to implement code to request a new access token when an access token has expired. As with the initial authorization, different backend services may implement token refreshes differently and/or may not be fully in compliance with a standard for providing a refresh token. In an embodiment, the proxy service handles the idiosyncrasies of obtaining a refresh token. Specifically, the proxy service may detect that an access token has expired (e.g., by inspecting the access token and/or if the backend service rejects the access token). The proxy service may then communicate with the backend service to refresh the access token (i.e., to obtain a new access token or extend the expiration period of the current access token). The user-facing service may be completely disconnected from the token refresh process.

5. Governing Usage of a Backend Service

Figure 4A:
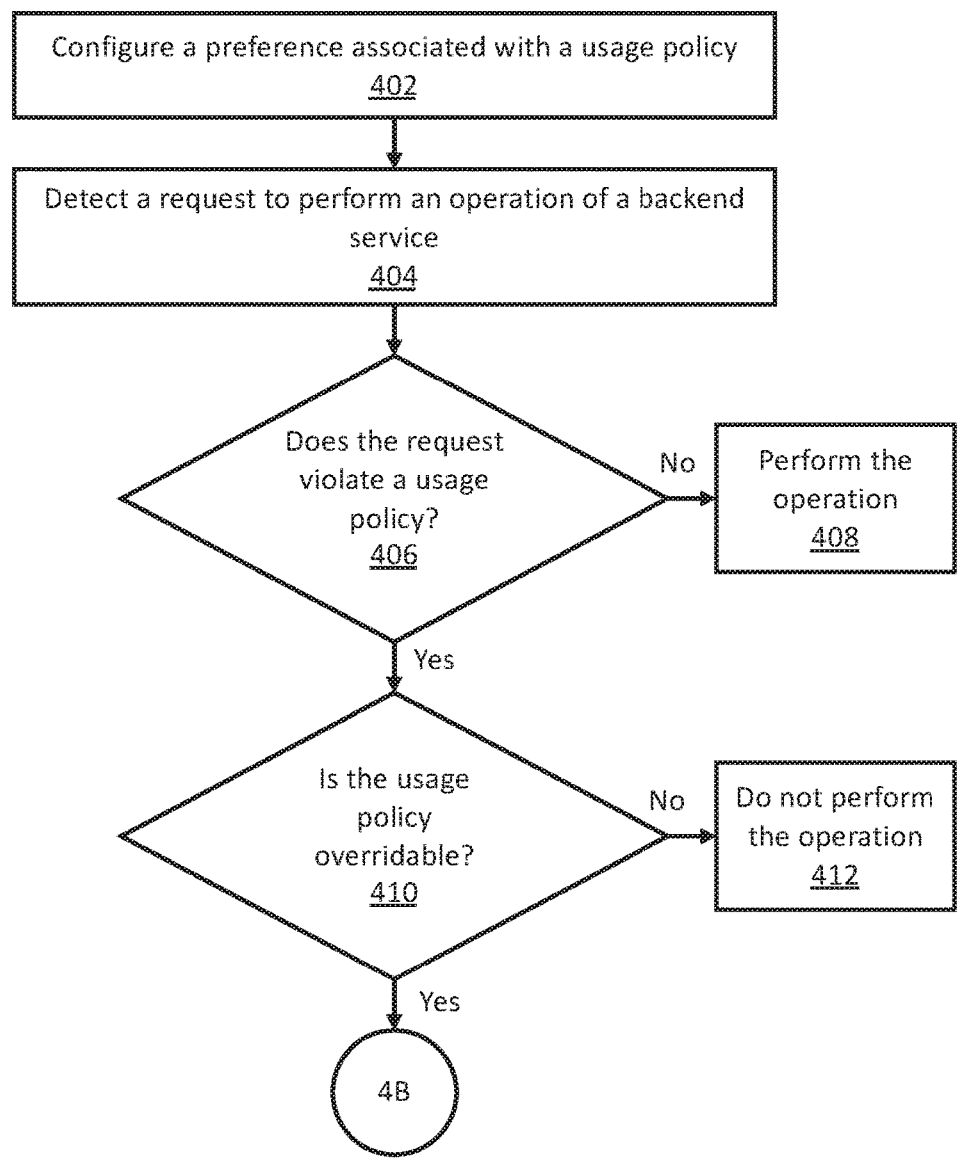
FIGS. 4A-4B illustrate a set of operations for governing usage of a backend service in accordance with one or more embodiments.
Figure 4B:
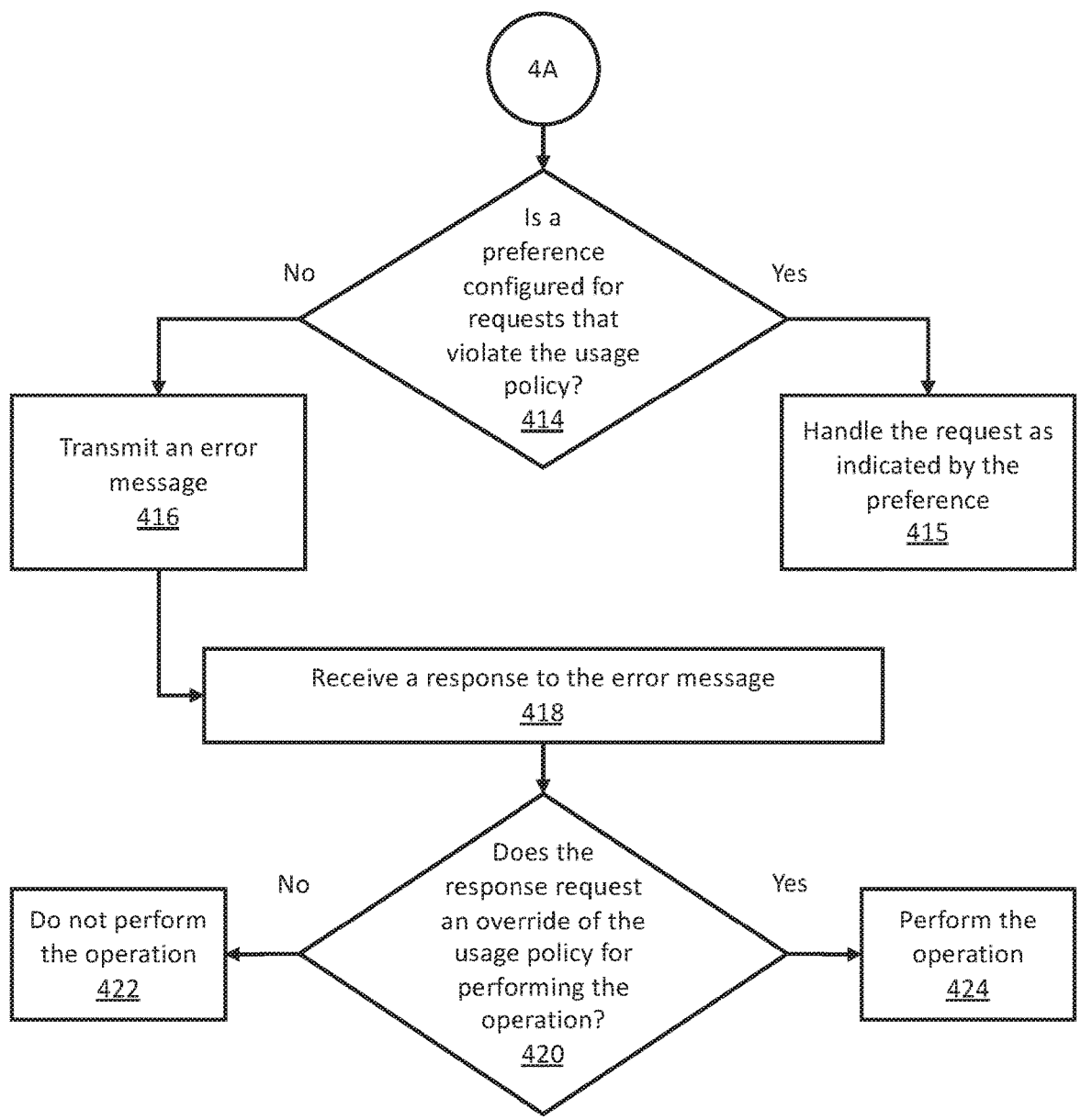

FIGS. 4A-4B illustrate a set of operations governing usage of a backend service in accordance with one or more embodiments. One or more operations illustrated in FIGS. 4A-4B may be modified, rearranged, or omitted all together. Accordingly, the particular sequence of operations illustrated in FIGS. 4A-4B should not be construed as limiting the scope of one or more embodiments.

In the following discussion, the term "governance mechanism" refers to a connectivity manager, proxy service, and/or any other configuration of hardware and/or software configured to govern access to a backend service. For example, a connectivity manager (e.g., connectivity manager 115 of FIG. 1) and/or proxy service (e.g., proxy service 116) may be configured to govern usage of a backend service while managing access to the backend service as part of a managed connection and/or authorization flow as described herein.

In an embodiment, the governance mechanism defines and/or enforces one or more usage policies associated with one or more backend services. A usage policy may be a legal policy (e.g., enforcing a legal prohibition or restriction associated with a particular backend service function), an organizational policy (e.g., a policy defined at an organizational level in service of an organizational goal or strategy), a user-defined policy (e.g., a policy defined by a particular user in service of an individual goal or strategy), and/or any other kind of policy or combination thereof. Examples of usage policies may include, and are not limited to: a data rate policy restricting data transmissions to a certain transfer rate; a data cap policy restricting data transmissions to a maximum amount in a particular time period; a legal policy restricting usage of a backend service functions based on one or more legal statutes and/or regulations; and/or an overage charge policy that imposes overage charges when data transmissions exceed a predefined amount in a particular time period.

In an embodiment, a usage policy is configurable. Specifically, the governance mechanism may support one or more preferences that define whether to enforce the usage policy and/or one or more specific conditions under which the usage policy should be enforced. In an embodiment, the governance mechanism configures a preference associated with a usage policy (Operation 402). The governance mechanism may configure the preference responsive to user input, supplied via a user interface, indicating the preference. The scope of the preference may be confined to a particular user (e.g., a particular user account used to execute a particular PIAR), a business unit, an organization, all uses of a backend service by any user and/or organization, and/or any other scope or combination thereof.

In an embodiment, the governance mechanism detects a request to perform an operation of a backend service (Operation 404). The operation may correspond to authorizing a user account to access the backend service, performing a function of the backend service, and/or any other operation of the backend service or combination thereof. For example, the governance mechanism may be associated with a proxy service, and may detect a request to authenticate a user account to access the backend service, and/or to perform a function of the backend service via the proxy service.

In an embodiment, the governance mechanism determines whether the request violates a usage policy (Operation 406). If the request does not violate the usage policy, then the governance mechanism allows the operation to proceed (Operation 408). In an embodiment, if the request does violate a usage policy, then the governance mechanism determines whether the usage policy is overridable (Operation 410). A usage policy may be overridable via a preference that applies to all requests, and/or via user input on a case-by-case basis as described below. If the usage policy is not overridable, then the governance mechanism does not allow the operation to proceed (Operation 412). The governance mechanism may ignore the request and/or generate an error message responsive to the request. The governance mechanism may store the error message (e.g., in a log file) and/or transmit the error message to a user (e.g., a user whose account is associated with the request and/or to an administrator of the governance mechanism).

In an embodiment, if the usage policy is overridable, the governance mechanism determines whether a preference is configured for requests that violate the usage policy (Operation 414). If a preference is configured, then the governance mechanism may handle the request as indicated by the preference (Operation 415), i.e., allow the operation to proceed or stop the operation from proceeding as indicated by the preference.

In an embodiment, a usage policy is overridable via user input on a case-by-case basis. When the governance mechanism detects that an operation, if performed, would violate the usage policy, the governance mechanism may transmit an error message to the entity requesting the operation (Operation 416). For example, a governance mechanism associated with a proxy service may transmit an error message to a user-facing service. A governance mechanism associated with a PIAR management application may transmit an error message to an administrator of the PIAR management application. The error message may indicate that the operation, if performed, would violate the usage policy. In addition, if the usage policy is overridable via user input, the error message may request user input indicating whether to override the usage policy to perform the operation in this instance.

In an embodiment, the governance mechanism receives a response to the error message (Operation 418). The response may include user input, responsive to the error message, indicating whether to override the usage policy to perform the operation in this instance. In an embodiment, the governance mechanism determines whether the response requests an override of the usage policy for performing the operation (Operation 420), even though doing so would violate the usage policy. If the response requests an override of the usage policy, then the governance mechanism allows the operation to proceed (Operation 424). If the response does not request an override of the usage policy, or explicitly indicates not to override the usage policy, the governance mechanism prevents the operation from proceeding (Operation 422).

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
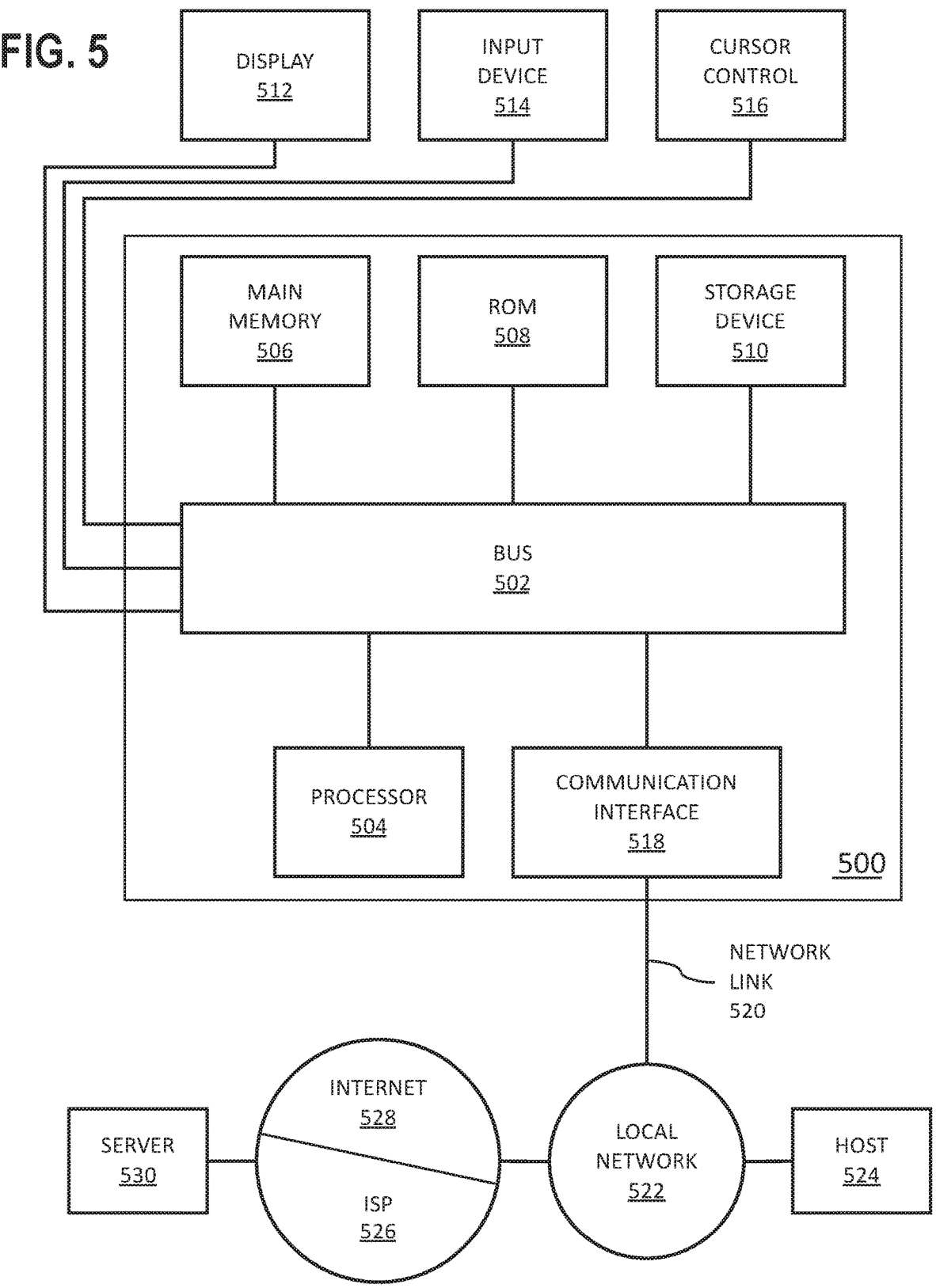
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), plasma display, electronic ink display, cathode ray tube (CRT) monitor, or any other kind of device for displaying information to a computer user. An input device 514, including alphanumeric and other keys, may be coupled to bus 502 for communicating information and command selections to processor 504. Alternatively or in addition, the computer system 500 may receive user input via a cursor control 516, such as a mouse, a trackball, a trackpad, a touchscreen, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. The display 512 may be configured to receive user input via one or more pressure-sensitive sensors, multi-touch sensors, and/or gesture sensors. Alternatively or in addition, the computer system 500 may receive user input via a microphone, video camera, and/or some other kind of user input device (not shown).

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 500 can receive the data from the network and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authorized or plugged in to the microservices manager, for example, with user-supplied application credentials to the manager, without requiring reauthorization each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    exposing, by a proxy service operating independently of a plurality of user-facing services and a plurality of backend services, an application programming interface (API) configured to receive requests from the plurality of user-facing services to perform a plurality of functions, respectively, of the plurality of backend services, wherein two or more of the plurality of the user-facing services are different from one another;
    storing, by the proxy service, user authorization data that authorizes a user of a particular user-facing service in the plurality of user-facing services to use a first function of a first backend service in the plurality of backend services, wherein the first backend service uses a first authorization standard and a second backend service uses a second authorization standard different from the first authorization standard;
    receiving, by the proxy service via the API, a first request to perform the first function of the first backend service for an account associated with the user;
    responsive to receiving to the first request: accessing, by the proxy service using the user authorization data, the first backend service to perform the first function for the account associated with the user.

2. The one or more media of claim 1, further storing instructions which, when executed by one or more processors, cause:
    receiving, by the proxy service from the first backend service, a confirmation that the first backend service successfully completed performing the first function.

3. The one or more media of claim 2, wherein the confirmation comprises an output of the first function.

4. The one or more media of claim 3, further storing instructions which, when executed by one or more processors, cause:
    responsive to receiving the output of the first function, using the output of the first function as input to a second function of one or more of: the first backend service; or the second backend service in the plurality of backend services.

5. The one or more media of claim 4, wherein using the output of the first function as input to the second function is performed based at least on a plug-in application recipe (PIAR) executed by a PIAR management application associated with the proxy service.

6. The one or more media of claim 1, further storing instructions which, when executed by one or more processors, cause:
    receiving, by the proxy service from the particular user-facing service, a request to discover backend service options supported by the proxy service; and
    responsive to the request to discover backend service options supported by the proxy service:
        transmitting, by the proxy service to the particular user-facing service, data describing a plurality of backend service options supported by the proxy service,
        wherein the plurality of backend service options comprises an option to use the first backend service.

7. The one or more media of claim 6,
    wherein the particular user-facing service presents, to the user, a user interface comprising the plurality of backend service options, and
    wherein the first request to perform the first function of the first backend service is based on a selection, by the user via the user interface, of the option to use the first backend service.

8. The one or more media of claim 1, further storing instructions which, when executed by one or more processors, cause:

governing, by the proxy service, usage of the first backend service according to a usage policy associated with the first backend service.

9. The one or more media of claim 8, further storing instructions which, when executed by one or more processors, cause:
receiving, by the proxy service, a second request to perform the first function of the first backend service for the account associated with the user;
responsive to a determination that performing the first function based on the second request would violate the usage policy: obtaining user input indicating whether to perform the first function in violation of the usage policy.

10. The one or more media of claim 8, wherein the usage policy comprises one or more of: a data rate policy; a data cap policy; a legal policy restricting usage of the first function of the first backend service; or an overage charge policy.

11. The one or more media of claim 1, further storing instructions which, when executed by one or more processors, cause:
registering the proxy service as a client, respectively, of each backend service in the plurality of backend services.

12. The one or more media of claim 1, further storing instructions which, when executed by one or more processors, cause:
registering each user-facing service in the plurality of user-facing services, respectively, as clients of the proxy service.

13. The one or more media of claim 1, further storing instructions which, when executed by one or more processors, cause:
obtaining, by the proxy service, an authorization code indicating that the user of the particular user-facing service is authorized to use the first function of the first backend service;
generating, by the proxy service, an authorization session identifier;
transmitting, by the proxy service to the particular user-facing service, the authorization session identifier, wherein the first request comprises the authorization session identifier;
responsive to the first request to perform the first function of the first backend service:
determining, by the proxy service, that the first request to perform the first function of the first backend service is authorized;
wherein accessing the first backend service to perform the first function for the account associated with the user comprises transmitting, by the proxy service to the first backend service, a second request to perform the first function of the first backend service;
receiving, by the proxy service from the first backend service, responsive to the second request to perform the first function of the first backend service, confirmation that the second request was authorized to perform the first function of the first backend service.

14. The one or more media of claim 13, wherein obtaining the authorization code comprises:
receiving, by the proxy service from the particular user-facing service, a request to authorize the user to use the first function of the first backend service;
responsive to the request to authorize the user to use the first function of the first backend service:
transmitting, by the proxy service to the particular user-facing service, instructions for the user of the particular user-facing service to supply credentials to the first backend service,
wherein the first backend service supplies the authorization code after the user supplies credentials to the first backend service; and
receiving, by the proxy service from the first backend service, the authorization code indicating that the user of the particular user-facing service is authorized to use the first function of the first backend service.

15. The one or more media of claim 14, wherein the request to authorize the user to use the first function of the first backend service comprises a scope of authorization corresponding to a subset of functionality exposed by the first backend service.

16. The one or more media of claim 13, further storing instructions which, when executed by one or more processors, cause:
receiving, by the proxy service from the particular user-facing service, a callback uniform resource locator (URL); and
after receiving the authorization code: transmitting, by the proxy service to the particular user-facing service, a confirmation message to the callback URL,
wherein the confirmation message comprises the authorization session identifier, and
wherein the particular user-facing service transmits the first request to the proxy service after receiving the confirmation message.

17. The one or more media of claim 13, further storing instructions which, when executed by one or more processors, cause:
transmitting, by the proxy service to the first backend service, the authorization code;
receiving, by the proxy service from the first backend service responsive to transmitting the authorization code, an access token that permits access to the first function of the first backend service;
generating, by the proxy service, a mapping of a unique authorization identifier to the access token; and
transmitting, by the proxy service to the particular user-facing service, the unique authorization identifier.

18. The one or more media of claim 10, further storing instructions which, when executed by one or more processors, cause:
determining that the first request to perform the first function of the first backend service comprises the unique authorization identifier; and
determining that the unique authorization process identifier is mapped to the access token.

19. A system comprising:
at least one device including a hardware processor;
the system being configured to perform operations comprising:
exposing, by a proxy service operating independently of a plurality of user-facing services and a plurality of backend services, an application programming interface (API) configured to receive requests from the plurality of user-facing services to perform a plurality of functions, respectively, of the plurality of backend services, wherein two or more of the plurality of the user-facing services are different from one another;
storing, by the proxy service, user authorization data that authorizes a user of a particular user-facing service in the plurality of user-facing services to use a first function of a first backend service in the plurality of backend services, wherein the first backend service uses a first authorization standard and a second backend service uses a second authorization standard different from the first authorization standard;

receiving, by the proxy service via the API, a first request to perform the first function of the first backend service for an account associated with the user;

responsive to receiving to the first request: accessing, by the proxy service using the user authorization data, the first backend service to perform the first function for the account associated with the user.

20. A method comprising:

exposing, by a proxy service operating independently of a plurality of user-facing services and a plurality of backend services, an application programming interface (API) configured to receive requests from the plurality of user-facing services to perform a plurality of functions, respectively, of the plurality of backend services, wherein two or more of the plurality of the user-facing services are different from one another;

storing, by the proxy service, user authorization data that authorizes a user of a particular user-facing service in the plurality of user-facing services to use a first function of a first backend service in the plurality of backend services, wherein the first backend service uses a first authorization standard and a second backend service uses a second authorization standard different from the first authorization standard;

receiving, by the proxy service via the API, a first request to perform the first function of the first backend service for an account associated with the user;

responsive to receiving to the first request: accessing, by the proxy service using the user authorization data, the first backend service to perform the first function for the account associated with the user, wherein the method is performed by at least one device comprising a hardware processor.

21. The one or more media of claim 1, further storing instructions which, when executed by one or more processors, cause:

registering the proxy service as a client, respectively, of each backend service in the plurality of backend services;

registering each user-facing service in the plurality of user-facing services, respectively, as clients of the proxy service; and responsive to the receiving operation, accessing the first backend service to perform the first function generating a session between the user account and the first backend service using the registration of the proxy service as a client of the first backend service and the registration of the user-facing service of the proxy service to establish an authorized session.

22. The one or more media of claim 21, wherein the accessing the first backend service further comprises:

creating an authorized session (1) between the proxy service and the first backend service and (2) between the user account and the proxy service; and identifying the authorized session as authorized to both the proxy service and the first backend service by generating an authorization identifier that identifies a user session corresponding to the user account and the first request as authorized.

23. The one or more media of claim 22, wherein the authorization identifier is transmitted to the first backend service instead of the user authorization data to indicate authorization to access the first backend service.

* * * * *